Patented Jan. 6, 1948

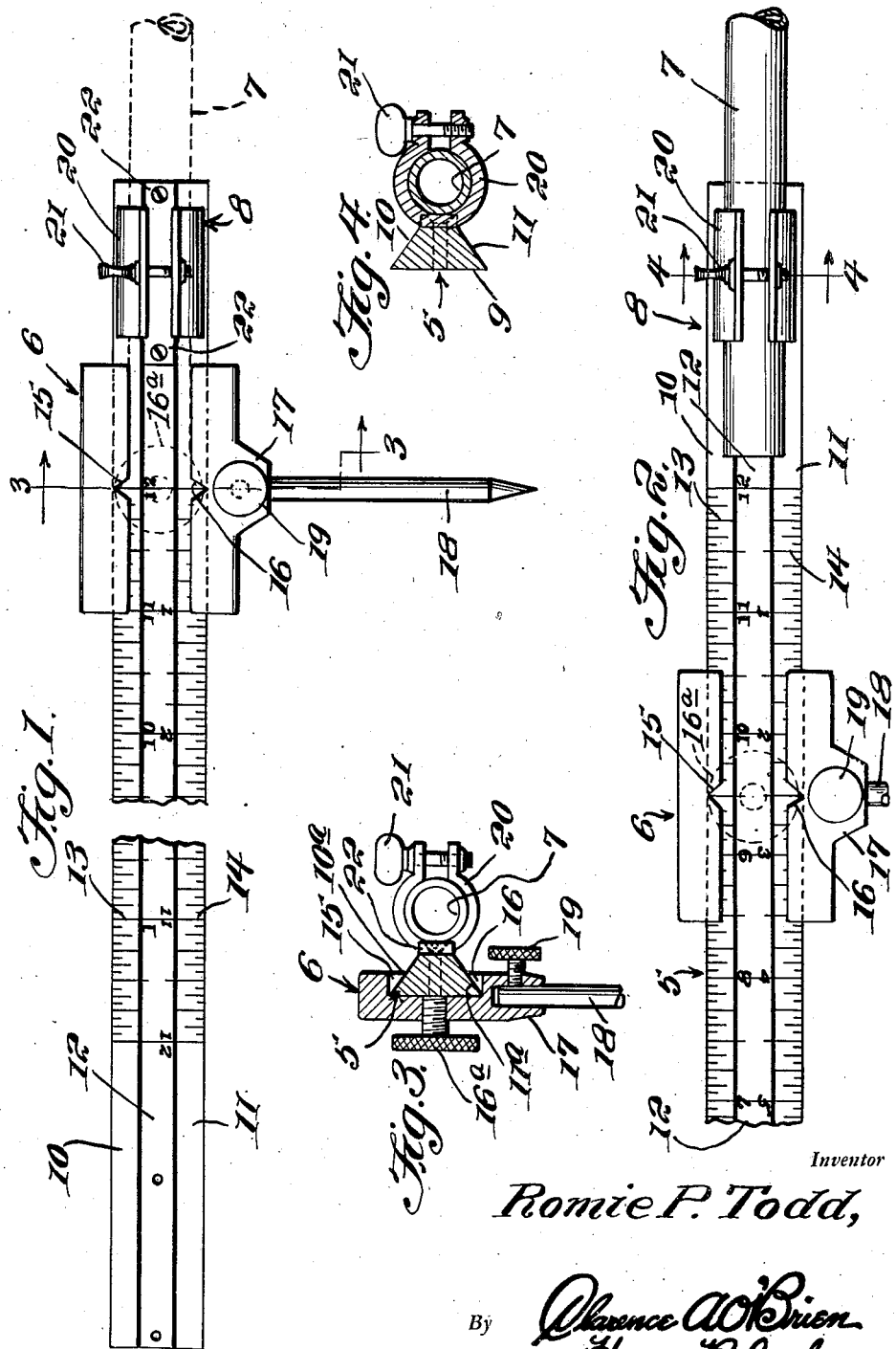

2,433,935

UNITED STATES PATENT OFFICE 2,433,935

OPPOSED CONTACT DISTANCE INSTRUMENT OF THE TRAMMEL BEAM TYPE

Romie P. Todd, Charleston, W. Va.

Application January 12, 1945, Serial No. 572,460

3 Claims. (Cl. 33—158)

This invention relates to precision tools and instruments, and has reference in particular to a composite structure characterized singly and collectively by companion parts which serve, somewhat in combination, to provide useful devices employable on jobs where slide trammels, calipers, dividers and the like are needed.

Briefly, the preferred embodiment of the invention is characterized by a double bevel-edged straight edge or scale, this provided, preferably at one end, with a simple rod and pipe clamp, and provided inwardly of this with a shiftable slide, said slide having indexes coacting with the graduations on the scale, and being provided with a thumb screw equipped socket to accommodate interchangeable points and scribing implements for diversified purposes.

More specifically, novelty is predicated upon the scale having oppositely diverging bevels along the longitudinal edges, these bevels being provided with selectively usable and suitably graduated scales, the slide being in the form of a block and having a channel opening through opposite ends, and this channel corresponding in cross sectional shape to that of the scale, the coacting faces thus conforming, whereby a simple set screw may be employed to maintain the slide in an accurate position and to thus pose the scribing point reliably in relation to the work to be measured and marked.

Other features and advantages will become more readily apparent from the following description and the accompanying illustrative drawing.

In the drawing, wherein like numerals are employed to designate like parts throughout the same:

Figure 1 is an elevational view of a scale device with a slide thereon, and a rod clamped thereon, these parts all assembled and constructed in accordance with the principles of the present invention.

Figure 2 is a similar view with the parts shifted in relationship to each other, the pipe or rod being here shown in full lines in the adapter clamp.

Figure 3 is a section taken on the plane of the line 3—3 of Figure 1, looking in the direction of the arrows.

Figure 4 is a similar transverse section, this on the plane of the line 4—4 of Figure 2.

Referring now to the drawing by distinguishing reference numerals, it will be seen that the complete structural arrangement is characterized by four major and distinguishable parts; namely, the precision scale instrument 5, the detachable point-carrier and slide 6, the pipe or rod 7 and the adapter spring clip or clamp 8 therefor.

The part 5 is a straightedge or so-called scale and, as shown, comprises a flat or plane wide surface 9 (see Fig. 4) and longitudinal diverging or beveled edges 10 and 11. The intervening crown portion 12 is flat, as shown. The beveled edges 10 and 11 are provided with graduations 13 and 14, respectively (see Fig. 1), these having suitable indexes on the face 12. One end portion of the scale, or preferably both end portions, may be left plain, as shown in Figure 1.

The slide 6 is in the form of a block rectangular in form, this having one face provided with a channel, and said channel opening through opposite ends and the longitudinal walls thereof being undercut to correspond to the sloping bevels 10 and 11, as at the points 10a and 11a (see Fig. 3). The opposed V-shaped notches 15 and 16 (see Figs. 1 and 2) are indexes and the vertex crotch portions coact with the graduations on the respective scales, exposing and clearly denoting same. This slide is adjusted and held in place by a set screw 16a, this engageable with the flat back 9 of the scale 5. The central lower edge portion of the slide block is provided with a projection recessed to provide a socket 17 which constitutes an adapter for scribing points 18 of an interchangeable standardized type. The points are slipped into the socket and held therein by a set screw 19. The point of the instrument 18 is directly in alignment with the vertex portions of the indicator notches 15 and 16.

As before indicated, the numeral 7 designates either a rod or a pipe which is attachable to one end portion of the instrument by way of a spring clip 8, whose jaw portions 20 conform to and firmly embrace the rod. The jaw portions are adjustable by a thumb screw 21. The clip 8 is provided with end extensions 22 which facilitate fastening said clip to the central portion 12 of the scale 5.

A careful consideration of the foregoing description in conjunction with the invention as illustrated in the drawing will enable the reader to obtain a clear understanding and impression of the alleged features of merit and novelty sufficient to clarify the construction of the invention as hereinafter claimed.

Minor changes in shape, size, materials and rearrangement of parts may be resorted to in actual practice so long as no departure is made from the invention as claimed.

I claim:

1. In a multiple-purpose precision instrument of the class described, a scale comprising an elongated body flat on its rear side, having a central flat portion on the opposite side and beveled along opposite longitudinal edges, said bevels being provided with graduations constituting singly and collectively usable scales, and a slide in the form of a block having a longitudinal channel opening through opposite ends, said channel conforming in cross sectional shape to the shape of the scale, the open side of the channel being provided with opposed V-shaped notches constituting indexes coacting with the graduations on said scale, said slide block being provided on one end with a projection formed with a socket, said socket being adapted to accommodate detachable standardized points, scribing instruments and equivalent attachments, there being a set screw for holding the slide in set position on the scale, and a second set screw carried by the socket to securely hold the points in place, and a spring clip detachably mounted on one end of said scale, said clip being constructed and adapted to accommodate rods, pipes and the like.

2. In a multiple-purpose device of the class described, a scale, a spring clip detachably mounted on one end thereof, said clip being adapted to accommodate rods, pipes and the like, and a slide in the form of a block on said scale, the scale having oppositely beveled graduated longitudinal edge portions, said block having a channel opening through opposite ends corresponding precisely in cross sectional dimension and shape to that of the scale, the block being provided with opposed V-shaped indicator notches, an extension formed with a socket, and a set screw coacting with said socket.

3. A multiple purpose device of the class described comprising a scale, a clip mounted on one end of said scale, said clip being adapted to accommodate rods, pipes and the like, and a slide in the form of a block, said block having a channel opening through opposite ends and said channelled portion being mounted for adjustment on said scale, said block being further provided with opposed V-shaped indicator notches and being provided in addition with an extension formed with a socket, and a set-screw mounted in said socket.

ROMIE P. TODD.

REFERENCES CITED

The following references are of record in the file of this patent:

UNITED STATES PATENTS

| Number | Name | Date |
|---|---|---|
| 893,478 | Goehle | July 14, 1908 |
| 1,327,114 | Rheim | Jan. 6, 1920 |
| 2,303,651 | Mason | Dec. 1, 1942 |

FOREIGN PATENTS

| Number | Country | Date |
|---|---|---|
| 395,514 | Great Britain | July 20, 1933 |